United States Patent [19]

Brands et al.

[11] 4,097,848
[45] Jun. 27, 1978

[54] READOUT UNIT FOR DATA STORED IN A RANDOM-ACCESS MEMORY AND PRESENTED ON A RASTER SCAN DISPLAY IN ACCORDANCE WITH A GIVEN LINE PATTERN

[75] Inventors: Antoon Hendrikus Brands, Borne; Jouke Gietema, Hengelo; Hendrik Cornelis Bleijerveld, Borne, all of Netherlands

[73] Assignee: Hollandse Signaalapparaten B.V., Hengelo, Netherlands

[21] Appl. No.: 773,909

[22] Filed: Mar. 3, 1977

[30] Foreign Application Priority Data

Mar. 26, 1976 Netherlands ............................ 7603159

[51] Int. Cl.$^2$ .............................................. G11C 11/26
[52] U.S. Cl. ...................................... 365/118; 365/217
[58] Field of Search ..................... 340/173 R, 173 CR; 328/123, 124

[56] References Cited

U.S. PATENT DOCUMENTS 3,624,633 11/1971 Hofstein .......................... 340/173 CR
3,723,978 3/1973 Maffitt ............................. 340/173 CR

*Primary Examiner*—Terrell W. Fears
*Attorney, Agent, or Firm*—Frank R. Trifari; Daniel R. McGlynn

[57] ABSTRACT

The invention relates to a readout unit for reading out and displaying at a magnification on a picture screen a fraction of the data stored in a random-access memory consisting of N × N simultaneously accessible submemories. The number of picture elements representing the data to be displayed is multiplied until the total number of picture elements required for the display of a picture line is obtained, while the number of picture lines is multiplied until the total number required for presentation on the entire picture screen is reached.

1 Claim, 1 Drawing Figure

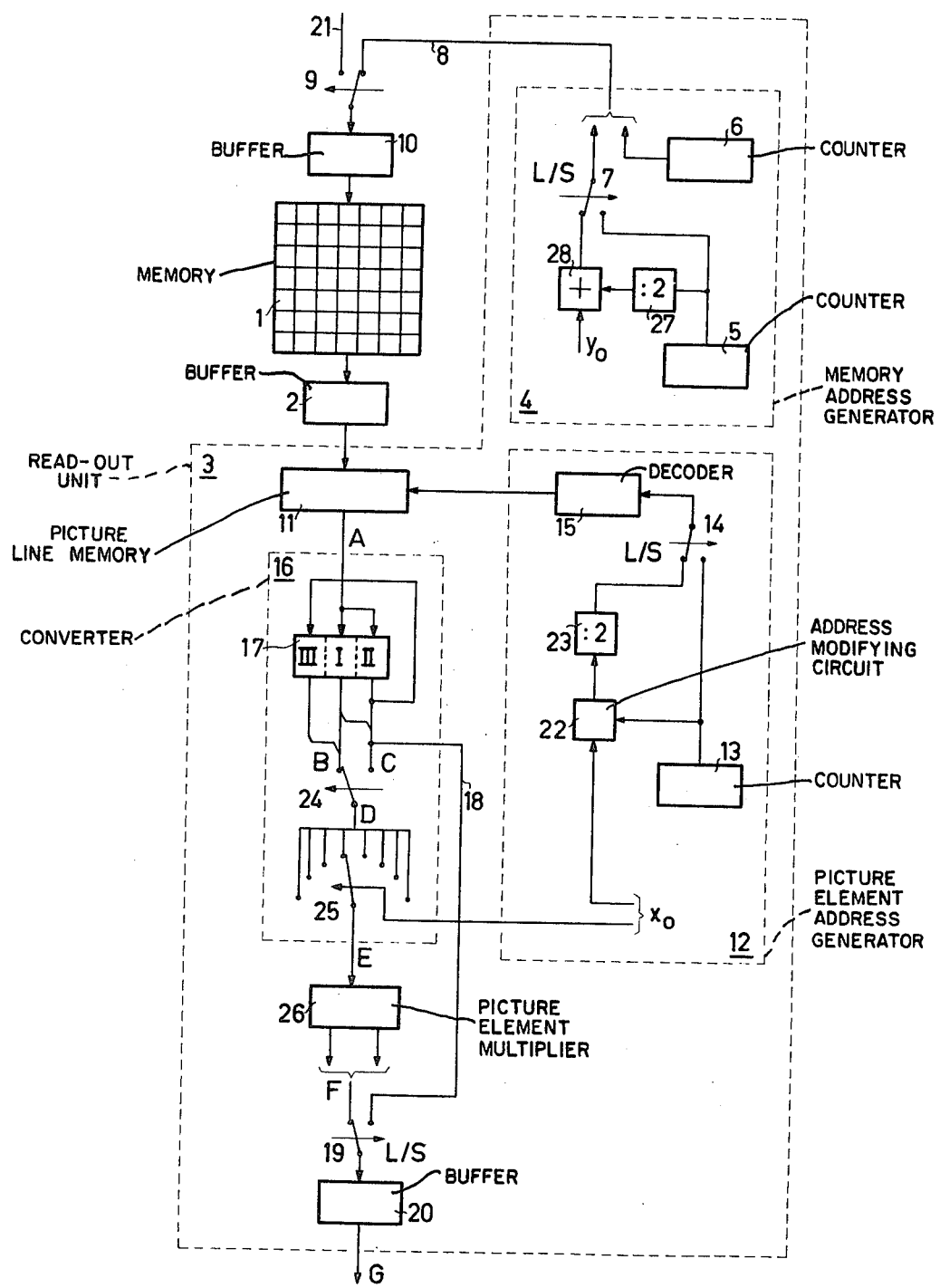

READOUT UNIT FOR DATA STORED IN A RANDOM-ACCESS MEMORY AND PRESENTED ON A RASTER SCAN DISPLAY IN ACCORDANCE WITH A GIVEN LINE PATTERN

The invention relates to a readout unit for data stored in a random-access memory and presented on a raster scan display in accordance with a given line pattern, the random-access memory consisting of N $\times$ N simultaneously accessible submemories all containing $a \times a$ memory elements, while for each picture line the relevant data is readout in $q$ bits simultaneously from each of the respective N submemories in a cycle of the random-access memory, and the readout unit contains at least one picture line memory for storing the data representing a picture line in order to be readout in the sequence as required for presentation on the raster scan display.

Such a unit is known from the Dutch patent application 76.01535 where it finds its application in a digital scan converter for the presentation of data on a raster scan display, which data is obtained from video signals supplied by a radar sensor. The incoming video signals are quantised and stored in a radar input buffer at addresses corresponding to the pattern according to which the field of view, determined by the radar sensor in azimuth and range coordinates, is scanned at a given (first) rate. The digital scan converter contains a random-access memory for storing data from the radar input buffer and an address generating circuit for generating addresses as function of the scan pattern and scanning rate to accommodate the data read from the radar input buffer at locations corresponding to the display line pattern to be realised on the raster scan display. The readout unit, as set forth in the opening paragraph, is used for reading out the data stored in the random access memory and to be presented on the raster scan display at a given (second) rate.

The cited Dutch patent application explains the method of determining the maximum number of picture lines and the division of the random-access memory into submemories in order to obtain an accurate picture reproduction. To give a clear picture of the object of the present invention, it should be noted that the raster consists of $b$ picture lines of each $b$ picture elements. Each picture element corresponds to a memory element of the random-access memory, which in turn contains N $\times$ N submemories of $a \times a$ memory elements ($a = b/N$); furthermore, each of the submemories consists of 1$k$ RAM's, i.e. of 1024-bit random-access memory modules. A number of $q = a^2/1024$ bits are read in parallel from each submemory. The data representing one picture line is readout from N submemories simultaneously, viz. $q$ bits in parallel from each submemory in a memory cycle. Thus $q$ N bits are readout in one memory cycle; hence, the data representing one picture line is readout in $b/q$N memory runs.

If $b = 896$, $N = 7$ and $q = 16$, the bits readout during a first memory cycle are:
0-15, 128-143, 256-271, 384-399, 512-527, 640-655, 768-783; during a second memory cycle:
16-31, 144-159, 272-287, 400-415, 528-543, 656-671, 784-799; during an eighth and final memory cycle:
112-127, 240-255, 368-383, 496-511, 624-639, 752-762-767, 880-895.

The data representing one picture line is stored in the picture line memory in the above sequence. This data is then read from the picture line memory in the sequence:
0-15, 16-31, 32-47, 48-63, ..., 864-879, 880-895.

This process is repeated for each picture line, resulting in a display of the entire memory contents on the raster.

However, if it is desired to display a certain fraction of the data stored in the random access memory on the whole of the raster, the number of picture lines and elements to be added to the picture elements corresponding to the data readout should be such that the whole of the raster is covered without giving rise to picture deformation or impeding the picture accuracy.

For example, if it is required to display $\frac{1}{4}$ of the memory content, thus the data of 448 picture lines and only 448 elements of these lines, starting for instance at the 140th line and the 50th element, it stands to reason that the data of the first 139 and the last 308 picture lines is not displayed nor the data of the first 49 and the last 399 picture elements forming part of the data of the 140th up to and including the 587th picture element. On the other hand, the data of the remaining picture elements is to be displayed magnified by a factor 4, i.e. in addition to the data of each of these picture elements, data of three additional picture elements must be generated.

It is an object of the present invention to provide a readout unit, as set forth in the opening paragraph, containing a circuit that facilitates the display of a fraction of the data stored in the random-access memory.

In order to display a fraction $\beta^2$ ($\beta = 1, \frac{1}{2}, \frac{1}{3}, \ldots$) of the data stored in the random-access memory on the whole of the raster, starting from a point given by the picture element coordinates ($x_o, y_o$), the readout unit according to the invention comprises:

a. a picture element address generator for addressing a fraction $\beta$ of the number of picture elements of a line in the picture line memory, for a fraction $\beta$ of the total number of picture lines, in a period of $1/\beta$ times that required for the presentation of the entire memory data on the raster scan display, starting from the point given by the picture element coordinates (q.integer[$x_o/q$], $y_o$), such that the data stored in the picture line memory is readout in the same groups of $q$ bits as stored in the picture line memory in the sequence as required for the picture line reproduction;

b. a picture element converter for delivering, on the reception of said groups of $q$ bits, new successive groups of $q$ bits representing the memory data to be displayed for each picture line fraction, starting from the picture element abscissa $x_o$;

c. a picture element multiplier for multiplying the number of picture elements representing the data to be displayed until the total number of picture elements required for the display of a picture line is obtained; and d. a memory address generator for reading a fraction $\beta$ of the number of picture lines $1/\beta$ times out of the random-access memory, starting from the picture element ordinate $y_o$, for storage into the picture line memory.

The invention will now be further described with reference to the accompanying FIGURE, illustrating schematically the readout unit according to the invention.

The FIGURE shows the random-access memory designated by 1. This memory consists of N $\times$ N submemories, all containing $a \times a$ memory elements and all being simultaneously accessible. Each memory element corresponds to one raster element of a raster scan display, on which the memory-stored data is displayed at a given frequency. The raster scan display is not shown in the FIGURE. The raster consists of $b$ picture lines of each $b$ picture elements, so that the memory contains $b^2$ ($b = Na$) memory elements.

In the preferred embodiment, $b = 896$, $N = 7$ and hence $a = 128$, while the readout frequency of the data stored in memory 1 is 55 Hz. The data for each picture line is readout of 7 submemories in a horizontal row simultaneously. In the preferred embodiment, each of the submemories consists of sixteen 1024 × 1 static RAM's (random-access memory modules), which can be read in sixteen bits in parallel. To readout the data of one picture line, the first sixteen elements in a row of the respective 7 submemories are taken first, then the next sixteen elements in a row of the submemories, etc. In this way, 7 × 16 elements are read in a memory cycle, so that a picture line of 896 elements is read in 8 memory cycles. If each memory element consists of a single bit, seven 16-bit words are read in parallel in a memory cycle, but are subsequently transported in serial form to a buffer register 2. If each memory element contains a plurality ($p$) of bits, 7 × $p$ 16-bit words are read simultaneously in a memory cycle and transported in serial form through $p$ channels to the buffer register 2, whose capacity is $p$ times as large in this case. For the sake of convenience, it is further assumed that a memory element consists of a single bit.

Apart from the preferred embodiment here described, it is assumed that the submemories are read in $q$ bits simultaneously. To read the data of one picture line, the first $q$ elements in a row of the respective N submemories are taken first, then the next $q$ elements in a row of the submemories, etc. In this way, $q$N elements are read in a memory cycle, so that a picture line of $b$ elements is read in $b/q$N memory cycles. The N words of $q$ bits read in parallel in a memory cycle are transported in serial form to the buffer register 2 and thence to a readout unit 3, which processes the applied data in a form suitable for presentation on a raster scan display.

Memory 1 is readout under the control of the memory address generator 4. This generator comprises a counter 5 for counting the $b$ picture lines and a counter 6 for the groups of $q$ picture elements in the corresponding submemories. In the preferred embodiment counter 5 provides the picture line address in 10 bits and counter 6 the address of the groups of 16 picture elements in 3 bits. In the latter case the addresses of the picture elements 0, 16, 32, 48, 64, 80, 96 and 112 are given for the first submemory; these addresses also apply to the corresponding picture elements of the remaining submemories, thus for the second submemory the picture elements 128, 144, 160, 176, 192, 208, 224 and 240, for the third submemory the picture elements 256, 272, 288, 304, 320, 336, 352 and 368, etc. The picture line addresses applied by counter 5 are transported via switch 7 in the position other than shown and, together with the picture element group addresses from counter 6, are stored into buffer register 10 via line 8 and switch 9 in the position as shown. These addresses are subsequently transported to memory 1.

The sequence in which the elements of memory 1 are read differs from that required for the display of the picture lines. For this reason, the readout unit 3 contains a picture line memory 11, storing, in the preferred embodiment, the data of the following picture elements in the given sequence:

$$\begin{cases} 0\text{--}15,\ 128\text{--}143,\ 256\text{--}271,\ 384\text{--}399,\ 512\text{--}527,\ 640\text{--}655,\ 768\text{--}783; \\ 16\text{--}31,\ 144\text{--}159,\ 272\text{--}287,\ 400\text{--}415,\ 528\text{--}543,\ 656\text{--}671,\ 784\text{--}799; \\ 112\text{--}127,\ 240\text{--}255,\ 368\text{--}383,\ 496\text{--}511,\ 624\text{--}639,\ 752\text{--}767,\ 880\text{--}895. \end{cases}$$

In general, the picture line memory 11 stores the data of the following picture elements in the given sequence:

$$\begin{cases} 0\text{--}(q\text{-}1),\ a\text{--}(a+q\text{-}1),...,\ (N\text{-}1)a\text{--}((N\text{-}1)a+q\text{-}1) \\ q\text{--}(2q\text{-}1),\ (a+q)\text{--}(a+2q\text{-}1),...,\ ((N\text{-}1)a+q)\text{--}((N\text{-}1)a+2q\text{-}1) \\ \\ (a\text{-}q)\text{--}(a\text{-}1),\ (2a\text{-}q)\text{--}(2a\text{-}1),...,\ (Na\text{-}q)\text{--}(Na\text{-}1). \end{cases}$$

In the preferred embodiment, the data stored in the picture line memory 11 is read in the sequence:

$$0\text{--}15,\ 16\text{--}31,\ 32\text{--}47,\ \ldots,\ 880\text{--}895,$$

and generally in the sequence:

$$0\text{--}(q-1),\ q\text{--}(2q-1),\ 2q\text{--}(3q-1),\ \ldots,\\ (na\text{--}q)\text{--}(Na-1).$$

This readout method is realised by the picture element address generator 12, containing a counter 13 and a decoder 15 connected to counter 13 by a switch 14 in the position other than shown. Although the above readout method for picture line memory 11 may also be realised with the aid of a counter and a decoder, the latter means are not shown in the FIGURE, since only address generator 12 is of concern for a good understanding of the invention. The write frequency of the picture line memory 11 need not equal the readout frequency of this memory, but the two frequencies should be greater than the frequency corresponding to the time required for the display of a picture line, which time is determined by the number of picture lines and the picture reproduction frequency.

The data read from picture line memory 11, i.e. the $b/q$ words of $q$ bits appearing successive for each picture line, is supplied to a register 17 forming part of a picture element converter 16. Each of the successively applied words is written in parts I and II of this register; then they are readout, transported via a cable 18 consisting of $q$ lines, and written into a buffer register 20 via a switch 19 in the position other than shown. From buffer register 20 the respective data is fed to a raster scan display. Although the data read from picture line memory 11 could be fed directly to buffer register 20, this occurs — as will be explained hereinafter — via the picture element converter 16, owing to a favourable design of the readout unit 3.

The readout unit, as hitherto described, can be applied in a digital scan converter. For example, in such a converter, data obtained from video signals received from a radar sensor can be presented on a raster scan display. In that case, the incoming video signals must be quantised and stored in a radar input buffer at addresses corresponding to the pattern according to which the field of view determined by the radar sensor in azimuth and range coordinates is scanned at a given (first) rate. The digital scan converter thereto contains a random-access memory arranged as indicated above. With each range scan performed for any azimuth value ($\Psi$) the range considered is divided into $n$ ($n \leq N$) segments of each $k$ range increments $\Delta r$, where the length $k\Delta r$ of each of these segments is at least equal to the distance represented by "a" memory elements multiplied by a factor √2. The scan converter further comprises an address generating circuit for generating addresses as function of the scan pattern and scanning rate to accommodate the data read from the radar input buffer in the random-access memory at locations corresponding to the display line pattern to be realised on the raster scan display. The address generating circuit consists of an azimuth counter, a sine/cosine generator, a start address generator delivering the start address values $kl\Delta r \cos \Psi$ and $kl\Delta r \sin \Psi$ (where $l = 0, 1, 2, \ldots, n-1$) on the supply of the signals from the sine/cosine generator, and an increment address generator that, considering the above $n$ start addresses, increments all $n$ start addresses by $\Delta r \cos \Psi$ and $\Delta r \sin \Psi$ in any random-access memory cycle, generating in $k$ successive random-access memory cycles the addresses $x = x_c + (lk+m)\Delta r \cos \Psi$ and $y = y_c + (lk+m)\Delta r \sin \Psi$, where $x_c$ and $y_c$ represent the coordinates of the radar sensor position, $l = 0, 1, 2, \ldots, n-1$ in each memory cycle and $m = 0, 1, 2, \ldots, k-1$. The stored data of the radar input buffer corresponding to the $n$ ranges of which the relevant addresses have been determined in each memory cycle, is transferred to the $x$ and $y$ address-defined positions of the random-access memory in the respective memory cycle, allocating a position within one submemory by one address only. Such a scan converter is described in the Dutch patent application 76.01535.

In addition to the data obtained from video signals supplied by a radar sensor, synthetic data may obviously be written into the random-access memory as well.

Data assigned for storage into the random-access memory is transferred to the buffer register 10 via cable 21 and switch 9 in the position other than shown. This data is subsequently transported to memory 1. Switch 9, under the control of a timing unit, is alternately in the position in which information and the addressing thereof is written into memory 1 via cable 21 and in the position in which data, which is addressed via cable 8, is read from this memory. The timing unit delivers the control signals required for the constituent parts of the readout unit as shown in the FIGURE. Since the timing aspects are deemed unnecessary for a good understanding of the invention, the timing unit is not shown in the FIGURE.

If it is desired to present a given fraction of the data stored in the random-access memory on the whole of the raster scan display, a number of picture lines and elements must be added to the picture elements corresponding with the readout data, such that the whole of the raster is covered.

Suppose that a fraction $\beta^2$ of the memory content is to be displayed, thus the data corresponding to $\beta b$ picture elements of $\beta b$ picture lines. In that case, the data of the remaining $(1-\beta)b$ picture lines required for display and the remaining $(1-\beta)b$ picture elements of the $\beta b$ picture lines must be added. In the circuit depicted in the FIGURE, $\beta=\frac{1}{2}$; therefore, the invention will first be described for this value of $\beta$, followed by a brief description of the measures to be taken when $\beta=\frac{1}{3},\frac{1}{4}$, etc. For the sake of convenience, the aforementioned parameters ($b=896, q=16$) are used in the preferred embodiment of the readout unit. The circuit according to the invention is essentially the same with the insertion of parameters other than cited above.

Assuming that the data of the picture lines 140-587 and the picture elements 50-497 is displayed on the whole of the raster. This data is stored in the picture line memory 11 successively for each picture line. The data of a picture line is readout from the picture line memory in groups of 16 bits. For the picture lines 140-587, only the data of the picture elements 50-497 is of concern; the data of picture elements 48-63, 64-79, 80-95, . . . , 480-495, 496-511 is however read from the picture line memory.

The addressing of this data in the picture line memory is realised in the picture element address generator 12. Counter 13 in this generator counts the positions of the picture line memory containing the data to be readout successively in groups of 16 bits. Since the essential data is that concerning picture elements starting from the picture element represented by the abscissa $x_o$ ($x_o$ is taken as 50), counter 13 is not to start with the address of the first group of 16 bits but with that of the third group of 16 bits. The group of bits to be addressed first, is determined by the value integer $[x_o/q]$, which is 3 in the case in question. This value is applied to a circuit 22, which modifies the addresses given by counter 13, such that the addresses of the desired groups of 16 bits are obtained, starting with the address of the group determined by $x_o$. The rate at which the circuit 22 provides the addresses of the 16-bit groups read from the picture line memory is to be halved since half of the groups is readout in the same time. The division into halves is performed in the frequency divider 23. With switch 14 in the position as shown the addresses are subsequently supplied to the decoder 15, finally reading the data representing the picture elements 48-63, 64-79, 80-95, . . . , 480-495, 496-511 out of the picture line memory in succession. The position of the manually operated switch 14 depends on displaying the complete data (large picture) in the random-access memory or a fraction of this data (small picture) on the whole of the raster. The control signal obtained manually for switch 14 is designated by L/S (large/small picture), and is identical for switches 7, 14 and 19.

The data read from the picture line memory is fed to a picture element converter 16. From the applied 16-bit groups the converter 16 produces new 16-bit groups which represent the memory data to be displayed for each picture line fraction, precisely beginning at the picture element abscissa $x_o$.

A group of 16 bits is written into parts I and II of register 17; part III of this register receives the bits contained in part II of the register before the writing of the above group.

Register 17 stores the following bits in the given sequence:

| part III | part II | part I |
|----------|---------|--------|
| —        | 48–55   | 56–63  |
| 56–63    | 64–71   | 72–79  |
| 72–79    | 80–87   | 88–95  |
| —        | —       | —      |
| —        | 480–487 | 488–495 |
| 488–495  | 496–503 | 504–511 |

The data at outputs B and C of register 17 is then as follows:

| output B | output C |
|----------|----------|
| 48–54    | 48–62    |
| 56–70    | 64–78    |

-continued

| output B | output C |
|---|---|
| 72–86 | 80–94 |
| — | — |
| 472–486 | 480–494 |
| 488–502 | 496–510 | it should be noted that the bit giving the greatest picture element number at outputs B and C is no longer important and is therefore omitted. The switch 24 passes the data at B and C alternately; the operating frequency of this switch is twice as high as the frequency at which the data is supplied by the register 17. Therefore, the 15-bit data passing point D concerns the following picture elements in the given sequence:

48-62, 56-70, 64-78, 72-86 . . . , 488-502, 496-510.

Of bits 0-14 at point D the bits 0-7, 1-8, 2-9, 3-10, 4-11, 5-12, 6-13 or 7-14 can be passed through switch 25, depending on the value $x_0$ - $q$.integer$[x_0/q]$. This value may be 0, 1, 2, . . . , 7 passing the bits 0-7, 1-8, 2-9, . . . ,7-14 respectively. In the case in question $x_0$ - $q$.integer$[x_0/q]$ is equal to 2, while bits 2-9 are passed. The data for the picture elements 50-57, 58-65, 66-73, 74-81, . . . , 490-497, 498-505 now appears at point E in the given sequence. The data is applied to the picture element multiplier 26. Before dealing with the operation of multiplier 26, the memory address generator 4 is discussed.

If switch 7 of memory address generator 4 is in the position as shown, the data concerning picture lines $y_o$—($y_o+\frac{1}{2}b$), in the present instance 140-587, is readout twice. The memory address generator 4 thereto contains a circuit 27, cutting the output signal of counter 5 in half. As a result of this, half the number of picture lines, instead of $b$ picture lines, are counted at half the rate. Since it concerns the data for picture lines $y_o$—(-$y_o+\frac{1}{2}b$), the output signal of circuit 27 is to be incremented by the value $y_o$; this is realised in the adder 28. As the addressing of the data for picture lines $y_o$—(-$y_o+\frac{1}{2}b$) in the random access memory 1 in a period twice as long, this data is readout twice. Hence, in the given instance, the data of picture lines 140, 140, 141, 141, 142, 142, . . . , 586, 586, 587, 587 is applied to the readout unit 3; in this way the data concerning 896 picture lines is readout once more.

In the picture element multiplier 26 the data concerning picture elements 50—505 is to be converted into data for the required 896 picture elements. To this effect, each supply line at point E is doubled. The data for picture elements 50-57, 58-65, 66-73, 74-81, . . . , 490-497, 498-505 is subsequently converted into data for picture elements
100-115, 116-131, 132-147, 148-163, . . . , 980-995, 996-1011, or numbered more appropriately 0-15, 16-31, 32-47, 48-63, . . . , 880-896;

the picture elements 896—911 are superfluous. In the latter series of elements the data of two adjacent picture elements is identical. Since the data of a picture line is readout twice in succession, the data for each four picture elements grouped in a square will be identical.

The data from the picture element multiplier 26 is written into the buffer register 20 via switch 19 in the position as shown. This data is subsequently applied to the raster scan display.

Hitherto the description has been confined to the arrangement of the device 3 for the case a quarter of the data stored in memory 1 is displayed on the whole of the raster. If however $\beta=\frac{1}{3}$, i.e. 1/9 of the data stored in memory 1 is displayed on the whole of the raster, $\frac{1}{3}$ of the number of picture lines are to be readout three times in succession. Hence, the addressing should take three times as long, the readout of $\frac{1}{3}$ of the number of picture elements takes three times as long, while the picture element multiplier is to be so designed that each 9 picture elements grouped in a square are identical.

What we claim is:

1. A readout unit for data stored in a random-access memory and presented on a raster scan display in accordance with a predetermined line pattern, the random-access memory including N × N simultaneously accessible submemories each containing $a \times a$ memory elements, for each picture line the relevant data is readout in $q$ bits simultaneously from each of the respective N submemories in a cycle of the random-access memory, and the readout unit contains at least one picture line memory for storing the data representing a picture line for being readout in the sequence as required for presentation on the raster scan display, wherein, in order to display a fraction $\beta^2 (\beta = 1, \frac{1}{2}, \frac{1}{3}, \ldots)$ of the data stored in the random-access memory on the whole of the raster, starting from a point given by the picture element coordinates $(x_o, y_o)$, the readout unit according to the invention comprises:
 a. a picture element address generator for addressing a fraction $\beta$ of the number of picture elements of a line in the picture line memory, for a fraction $\beta$ of the total number of picture lines, in a period of $1/\beta$ times that required for the presentation of the entire memory data on the raster scan display, starting from the point given by the picture element coordinates ($q$.integer$[x_o/q]$, $y_o$), such that the data stored in the picture line memory is readout in the same groups of $q$ bits as stored in the picture line memory in the sequence as required for the picture line reproduction;
 b. a picture element converter for delivering, on the reception of said groups of $q$ bits, new successive groups of $q$ bits representing the memory data to be displayed for each picture line fraction, starting from the picture element abscissa $x_o$;
 c. a picture element multiplier for multiplying the number of picture elements representing the data to be displayed until the total number of picture elements required for the display of a picture line is obtained; and
 d. a memory address generator for reading a fraction $\beta$ of the number of picture lines $1/\beta$ times out of the random-access memory, starting from the picture element ordinate $y_o$, for storage into the picture line memory.

* * * * *